Figure 1:
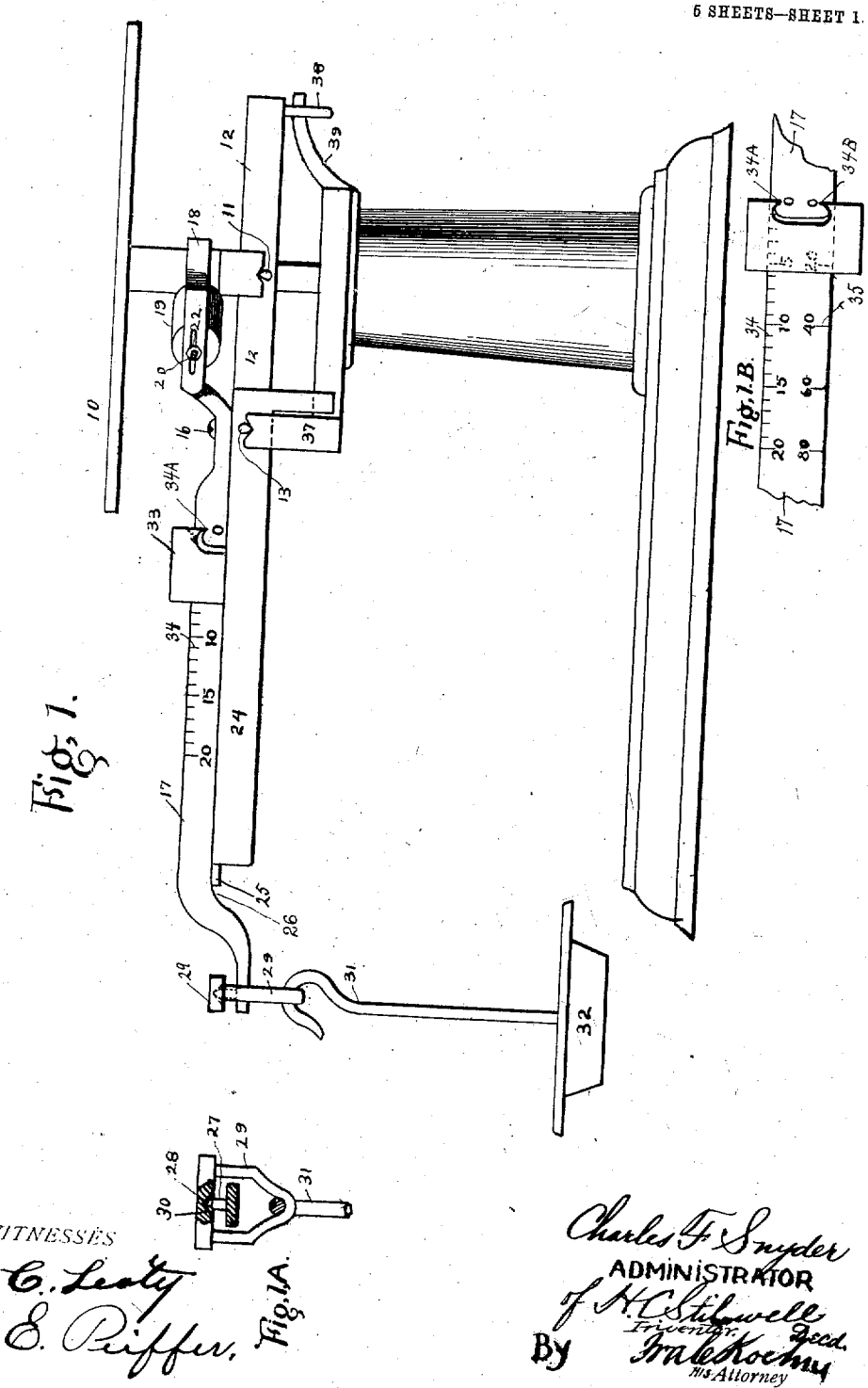

No. 754,395. PATENTED MAR. 8, 1904
H. C. STILWELL, DEC'D.
C. F. SNYDER, ADMINISTRATOR.
COMPUTING SCALE.
APPLICATION FILED JULY 16, 1897.
NO MODEL. 5 SHEETS—SHEET 1.

No. 754,395. PATENTED MAR. 8, 1904.
H. C. STILWELL, DEC'D.
C. F. SNYDER, ADMINISTRATOR.
COMPUTING SCALE.
APPLICATION FILED JULY 16, 1897.
NO MODEL. 5 SHEETS—SHEET 2.

No. 754,395. PATENTED MAR. 8, 1904.
H. C. STILWELL, DEC'D.
C. F. SNYDER, ADMINISTRATOR.
COMPUTING SCALE.
APPLICATION FILED JULY 16, 1897.

NO MODEL. 5 SHEETS—SHEET 3.

Fig. 3

WITNESSES

Charles F. Snyder
ADMINISTRATOR
H. C. Stilwell
Inventor, Dec'd
By
His Attorney

No. 754,395. PATENTED MAR. 8, 1904.
H. C. STILWELL, DEC'D.
C. F. SNYDER, ADMINISTRATOR.
COMPUTING SCALE.
APPLICATION FILED JULY 16, 1897.

NO MODEL. 5 SHEETS—SHEET 4.

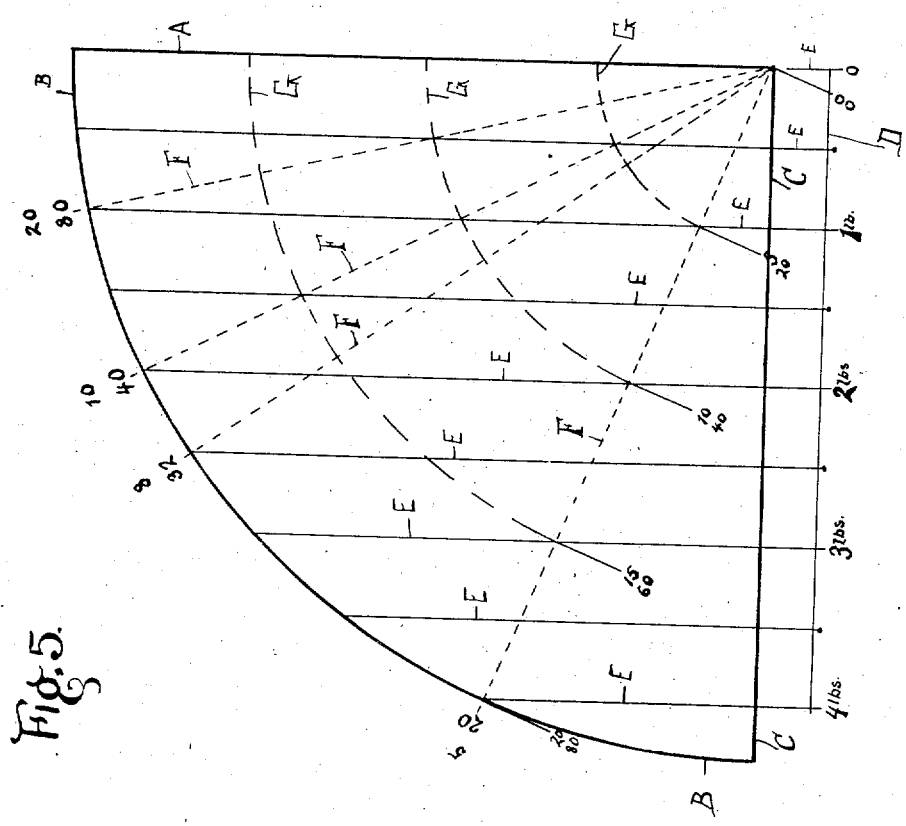

No. 754,395. Patented March 8, 1904.

UNITED STATES PATENT OFFICE.

CHARLES F. SNYDER, OF DAYTON, OHIO, ADMINISTRATOR OF HENRY C. STILWELL, DECEASED.

COMPUTING-SCALE.

SPECIFICATION forming part of Letters Patent No. 754,395, dated March 8, 1904.

Application filed July 16, 1897. Serial No. 644,840. (No model.)

*To all whom it may concern:*

Be it known that I, CHARLES F. SNYDER, a citizen of the United States, residing at Dayton, in the county of Montgomery and State of Ohio, am administrator of the estate of the late HENRY C. STILWELL, of Dayton, Montgomery county, Ohio, and who had invented certain new and useful Improvements in Computing-Scales, of which the following is a specification, reference being had to the accompanying drawings, forming a part hereof.

This invention relates to a radically new construction and mode of operation of computing-machines; and it more particularly relates to that class of computing-machines technically known as "computing-scales."

As will hereinafter more fully appear, the invention consists in and contemplates, among other things, the employment of a weight-receiving member, a weight-counterbalancing member, a value-indicator, and a variable incline, said incline being intermediate either or both said value-indicator and weight-counterbalancing member and the said weight-receiving member, said incline being adapted to control either or both said value-indicator and said weight-counterbalancing member to indicate or counterbalance or to indicate and counterbalance at a rate proportionate to the angle of inclination of said incline, which incline and its angle of inclination is adapted to be varied proportionate to the price per pound or computing unit.

In the drawings I have shown the invention as applied to a simple lever-scale—that is, a scale in which the fulcrumed beam is directly connected to the weight-receiving member, such as a pan or platform, while the value-indicator, the weight-counterbalancing member, and the price-varying incline is shown attached to said fulcrumed beam—and it is obvious that this invention can be embodied in all the known forms of scales when the following description of this invention is consulted by those skilled in the art, and it is also obvious that this invention can be embodied in what are known as "compound" lever scales—that is, scales in which a series of levers are interposed between the weight-counterbalancing member and the weight-receiving member, in which series of levers the price-varying incline and the value-indicator may be located without departing from the broad scope and spirit of the invention.

Several different forms of the invention have been devised, all of which forms embody the new construction and mode of operation heretofore described, and it is thought that others will be able to devise still other forms when the principle and mode of operation of the invention is explained to them by the following description of the invention.

Therefore the invention is not to be restricted in its broader scope to any particular construction or arrangement of apparatus, but contemplates all forms of apparatus embodying the new principle and mode of operation however widely they may differ in construction and arrangement.

Figure 2:
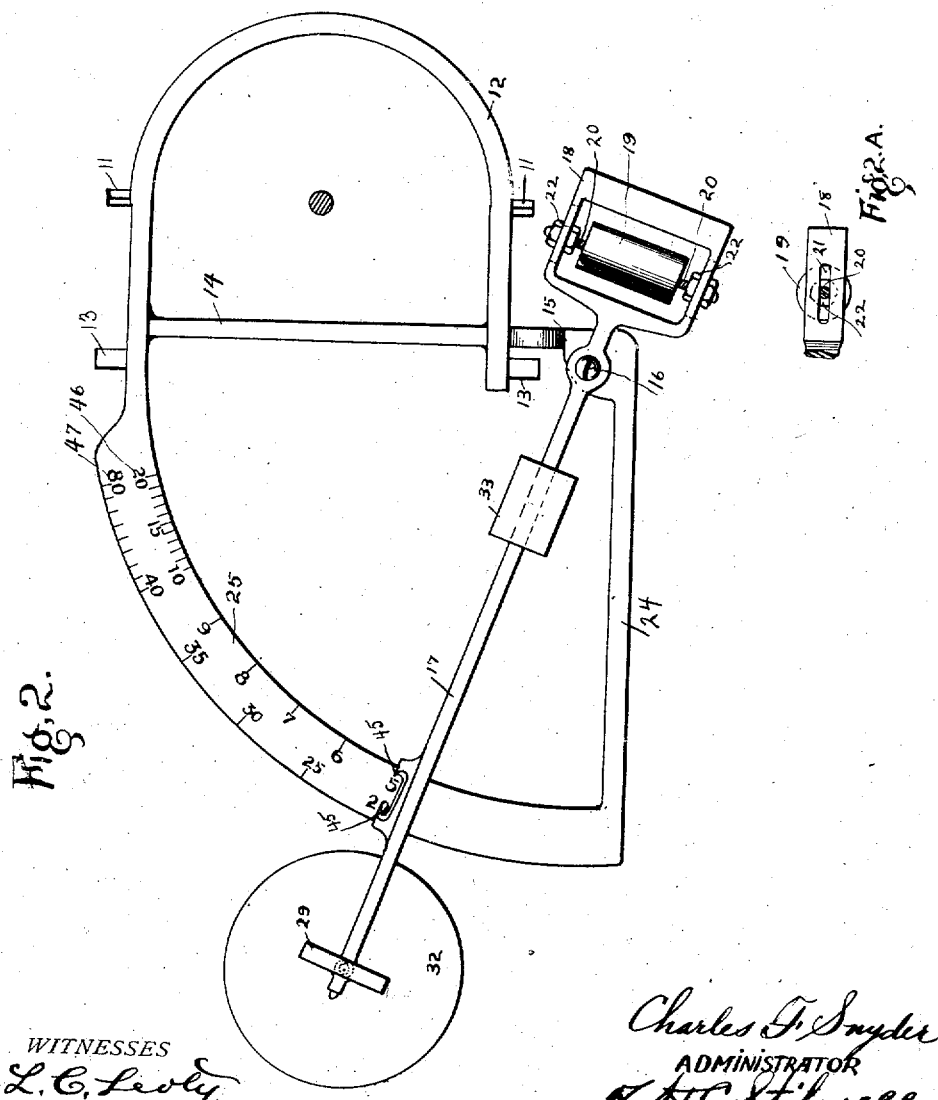
Figure 4:
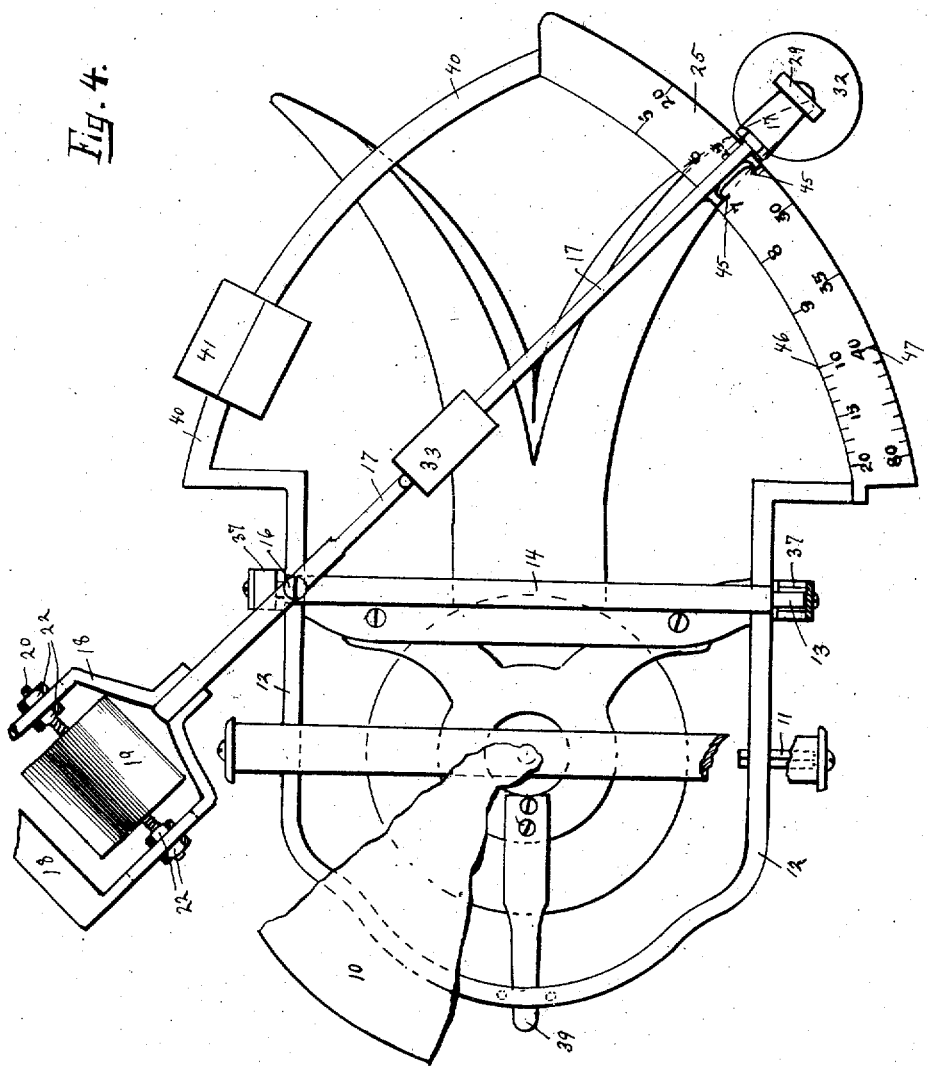

In the accompanying drawings, illustrating the invention, Figure 1 illustrates a side elevation of a simple lever-scale to which the invention is applied. Fig. 1$^A$ is a detailed front view, partly in section, of the stirrup 29 and its connections. Fig. 1$^B$ is a detail of the graduated portion of beam 17. Fig. 2 is a top plan view of the fulcrumed frame or beam and the counterbalancing member or beam 17, pivoted thereto. Fig. 2$^A$ is a side elevation of the end 18 of beam 17. Fig. 3 is a rear elevation of a simple lever-scale provided with the elements of this invention in connection with a novel tare-beam. Fig. 4 is a top plan view of the arrangement shown in Fig. 3, the plan being taken for convenience with the front of the machine toward the bottom of the sheet, while a portion of the weight-receiving member and its connection with the counterbalancing-frame are broken away to expose parts beneath; and Fig. 5 is a diagrammatical view illustrating the principle of this invention.

Like characters of reference are employed to designate identical parts throughout the several views.

For a preliminary exposition of this invention reference is had to Fig. 5, wherein line A represents the fulcrum-line of a frame in balance with the weight-receiving member, which frame is represented by a curved line B and a straight line C. Parallel with line C is a line D, having transverse lines E running therethrough and across line C and joining with line B, which lines E represent pounds and ounces, as indicated, adjacent to said line D. In this instance shown the price-per-unit-indicating characters "5" and "20" are located adjacent to line B at a point where the dotted radial line F passes through the point of intersection of said line B and said four-pound-indicating line E, while the price-indicating characters "8" and "32" are located opposite the point of intersection of the two-and-one-half-pound-indicating line E and line B. The price-indicating characters "10" and "40" are located opposite the point of intersection of the two-pound-indicating line E and line B, while the price-indicating characters "20" and "80" are located opposite the point of intersection of the one-pound-indicating line E and the line B. The dotted radial lines F intermediate the lines A and C and intersecting the line B represent the weight-counterbalancing member or beam in the different positions it would occupy when computing values at the different rates indicated, while the numbered graduations parallel with and adjacent to the dotted line F nearest to line C indicates the value-graduations upon the weight-counterbalancing member, and the curved dotted lines G, drawn from each value graduation and concentric with said curved line B, are shown for the purpose of transferring and readily indicating said value-graduations upon the lines F, shown in the different positions. From this diagrammatical view, as above described, it will readily be seen that the correct and proper spacing of the price-indicating characters are obtained and that the lines E parallel with the fulcrum line A indicate pounds and ounces at regular distinces as they advance from said line A, commencing with zero in line with said line A.

It will furthermore be observed that when the weight-counterbalancing member or beam indicates "5" or "20" as the computing unit or price per pound, as shown by the dotted radial line F in Fig. 5 and the indicated values adjacent to said line F, that when said weight-counterbalancing member counterbalances three pounds of an article at five or twenty per pound the indicated value will be "15" or "60," while if the article weighed but two pounds the value indicated upon the weight-counterbalancing member would be "10" or "40." Likewise if the article weighed but one pound its indicated value would be "5" or "20." Again, if the angle of inclination of the weight-counterbalancing member (designated by F) indicated "8" or "32" as the price per pound then two and one-half pounds of an article would be counterbalanced when "20" or "80" was indicated as the value. Again, if "10" or "40" was indicated by the angle of inclination of the weight-counterbalancing member to be the price per pound then one-half pound of an article would be counterbalanced when the weight-counterbalancing member indicated "5" or "20" as the value. Likewise if the article weighed one and one-half pounds it would be counterbalanced when the weight-counterbalancing member indicated "15" or "60" as the value. Again, if the angle of inclination of the weight-counterbalancing member (indicated by F) designated "20" or "80" as the price per pound then an article weighing one-half pound would be counterbalanced when the weight-counterbalancing member indicated "10" or "40" as the value.

A study of Fig. 5 will illustrate that the price-per-pound-indicating characters are not only arranged variable distances apart upon the segment B to indicate regular rises in value, but also that said price-indicating characters are also arranged variable distances apart upon a straight line, should such straight line be drawn at right angles to the line A, to indicate regular rises in value of the computing unit, the value of said computing unit being greater nearer the fulcrum-line A and decreasing at irregular intervals toward the end of the frame and away from said fulcrum-line A of said frame.

As hereinafter shown, the weight-counterbalancing member F, Fig. 5, employed is a beam and poise movable thereon and indicating the value-graduations on said beam.

It is obvious that if it were desirable to have both weight and value indicated at the same time the poise could simply be provided with a pointer to designate the weight-indicating lines E simultaneously with the value-graduations upon the beam, (indicated by F in Fig. 5,) in which case the value-graduations would be upon the beam, while the pound-and-ounce-indicating lines E would be upon the frame and extend between the sides B and C of said frame. It is furthermore obvious that many other minor changes within the province of a skilled mechanic may be made in constructing machines for the different requirements of the market and that many changes in form, construction, and arrangement of the parts may be made without departure from the principle and scope of this invention. Likewise it is obvious that the price-indicating characters may be arranged upon a part projecting in a straight line from and intermediate the length of and at right angles to the fulcrum-line A, and the weight-counterbalancing member or beam may be slidably mounted at its end upon said part in the same manner as said beam is hereinafter shown to rest upon said frame near the end of said beam, except that the bearing-point between said straight price-graduated part and said beam would vary according to the angle of inclination of said beam.

In Figs. 1 to 4, 10 represents the weight-receiving member, which may be a suitable pan or platform directly or indirectly connected to knife-edged pivots 11 on opposite sides of a frame 12, provided with fulcrum-pivots 13 on opposite sides. Said frame 12 is composed of a substantially U-shaped frame having a transverse connection 14 between the respective pivots 11 and 13. From one side of said frame 12, Figs. 1 and 2, extends an integral projection 15, to which is pivoted by pin or screw 16 a weight-counterbalancing member or beam 17, said pin or screw 16 being vertically in line with the knife-edges of said fulcrum-pivots 13. To the rear of said pin or screw 16 said beam 17 is provided with a preferably D-shaped projection 18, receiving a counterbalance weight or ball 19, mounted upon screw or stem 20, mounted in slot 21 in said projection 18, and said screw 20 is adapted to be locked to said projection 18 by means of a series of lock-nuts 22 on said screw 20 at opposite sides of the walls of said projection 18, Fig. 2. From the outer end of said projection 15 extends an arm 24, preferably in a straight line, Fig. 2. The extreme end of said arm 24 is connected to the opposite side of said frame 12 by a segment 25, preferably in the arc of a circle from the center of said pin or screw 16. The outer end of said beam 17 rests upon the top of said segment 25, and its under surface is brought down below the level of the segment, whereby a space is provided at 26 to accommodate said segment 25. The extreme outer end of said beam 17 is provided with a pin 27, projecting vertically therefrom, and said pin terminates in a needle-point 28, which point is horizontally in line with the knife-edges of said pivots 11 and 13. A stirrup 29 extends over the outer end of said beam 17 and is provided with a conical-shaped recess 30, Fig. 1ᴬ, adapted to receive said needle-point 28 of pin 27. In said stirrup 29 is hooked a rod 31, having secured upon its lower end a shot-cup or counterweight receiving member 32.

It is obvious that a knife-edged pivot and the usual bearing-loop may be employed, if desired, in place of said pin 27 and stirrup 29.

Beam 17 is provided with a poise 33, having projections 34ᴬ and 34ᴮ, adapted to register with a series of rows of characters or graduations on the beam in the usual manner. The two rows 34 nearest the upper edge on both sides of the beam 17 indicate money value at low prices per pound, while the next lower row 35 indicates values at higher prices per pound.

The fulcrum-pivots 13 of frame 12 are provided with bearings in projections 37 of the framework of the machine, and said frame 12 is provided with a slotted portion 38, receiving projection 39 of the framework of the machine, for the purpose of limiting the pivotal movement of said frame 12.

Thus far my description has been confined to Figs. 1 and 2 of the drawings. Said description given for Figs. 1 and 2 will likewise apply to Figs. 3 and 4, with the exception that beam 17 is pivotally mounted upon cross-piece 14 and between knife-edges 13 and the arm 24 in Figs. 1 and 2 is straight, while in Figs. 3 and 4 the arm 40 (corresponding to said arm 24 in Figs. 1 and 2) extends forward and is curved toward the segment 25 and is provided on its upper edge with a series of pound and ounce graduations 42 variable distances apart and adapted to coöperate with a poise 41, sliding on said curved arm 40 in the usual manner that a poise slides upon a beam to indicate pounds and ounces. This curved arm 40 and its poise 41 constitute the means for counterbalancing tare-weights.

It is obvious that the straight arm 24, Figs. 1 and 2, may likewise constitute a tare-beam when provided with a poise and suitable graduations.

The weighted end 18 of beam 17 is adapted to counterbalance the forward portion of the beam 17, its stirrup 29, rod 31, and receiver 32, together with its poise 33 when said poise 33 is at normal position or indicates zero. This counterbalancing of said beam 17, so that the parts of said beam 17 upon opposite sides of its pivot 16 counterbalance each other, is necessary, for the reason that said beam 17 swings radially toward and from the fulcrum-point of said frame 12, and in so moving toward said fulcrum-point said beam 17 would destroy the balance or equilibrium of said frame 12 were it not for the counterbalancing of said beam 17. Said pivot 16 of beam 17 has heretofore been described as located in vertical line with the knife-edges of said pivots 13, and it is obvious that said pivot 16 may be located at a point on said frame 12 to one side of said pivot 13 without departure from the letter and spirit of this invention, since the object of counterbalancing said beam 17 upon said pivot 16 is to concentrate the entire weight of beam 17 and its connections at a point upon said frame 12 fixed by the attaching of said pivot 16 to said frame 12. As heretofore stated, the angle of inclination of said beam 17 varies with the price per pound, and this price per pound or computing unit is indicated upon the top face of said segment 25 by projections or indicating-points 45 upon said beam 17, pointing to two rows of characters upon said segment 25, the row 46 of said characters indicating units or prices per pound whose values are indicated in the row of characters 34 upon beam 17, while the row of characters 47 upon said segment 25 indicate the units or prices whose values are found in row 35 of value-graduations on said beam 17.

It is obvious that any suitable means may be employed for indicating the rows 46 and 47 of price-graduations and that said indicating-points 45 were employed for this purpose, for the reason that they constitute the best-known and ordinary means for indicating graduations upon scales.

It will be observed that the rows 46 and 47 of price-indicating characters upon the beam or segment 25 are variable distances apart to indicate regular rises in value and commence at the outer free end of said beam or segment 25 at a low price and increase as said price-graduations approach the fulcrum 13, the distances between said price-indicating characters being greater near the outer free end of said beam or segment 25 than nearer said fulcrum 13 to indicate regular rises in value of the computing unit or price per pound and that the value-indicating characters 34 and 35 on beam 17 are uniform distances apart to indicate regular rises in value from zero near the pivot 16 of said beam 17 and increasing in value toward the outer free end of said beam 17.

65 in Fig. 3 represents a counterweight to be placed upon the receiver 32, connected to beam 17 when poise 33 is insufficient to counterbalance the weight of an article. Weight 65 is provided with value-indications 66 and 67, corresponding with rows 34 and 35 on beam 17, respectively.

Having now fully described the construction of this invention, its operation will now be described, reference being had to Figs. 1 and 3. To compute the value of an article, place it upon the weight-receiving member 10 and adjust the angle of inclination of beam 17 until one of its points 45 indicates the price per pound of said article in either of said rows 46 and 47 of price-indications upon said segment 25. Then move poise 33 upon beam 17 until frame 12 is in balance or equilibrium. Said poise 33 then indicates the value of said article in either row 34 or row 35 of value characters on said beam 17. Should the movement of the poise 33 be insufficient to counterbalance the weight of the article and place frame 12 in equilibrium when the article rests upon the weight-receiving member 10, connected only to said frame 12, then one or more weights 65 are placed upon said receiver 32 until said frame 12 is placed in equilibrium by the readjustment of the said poise 33, the value indicated upon said weight 65 being added to the value indicated by said poise 33 upon beam 17. The frame 12 is in balance or equilibrium when poise 33 indicates "0," and by reason of the counterbalancing of said beam 17 said beam exerts no counterbalancing influence upon frame 12 when its poise 33 is at normal position; but when said poise 33 is moved from normal position it counterbalances weight proportionate to the distance said poise 33 is moved from the fulcrum-line of said frame 12 and that the greater the angle of inclination of beam 17 from fulcrum-line of said frame 12 the more weight a given movement of said poise 33 will counterbalance. Consequently the greater the angle of inclination of said beam 17 the smaller is the price per pound.

It will be observed that the counterbalance-weight 19 for the beam 17 is mounted upon a shaft 20, extending at right angles with reference to the direction of beam 17, and that the opposite ends of said shaft 20 are secured in slot 21 in frame 18, secured to beam 17, and that said slots 21 extend in a direction parallel with beam 17, the operation of which construction is such that said weight 19 is adjusted on shaft 20 in order to adjust the longitudinal gravity-line of beam 17 and its attached parts until said longitudinal gravity-line coincides with a straight line drawn from the center of pivot 16 of beam 17 through the needle-point 28 upon pin 27 upon the outer end of said beam 17, while said shaft 20 is adapted to be adjusted in said slots 21 until the opposite ends of beam 17 counterbalance each other at a point coinciding with the center of said pivot 16, when poise 33 indicates "0." These adjustments for the beam 17 are essential, owing to the fact that said beam 17 swings radially to and from the fulcrum-line of the frame upon which it is mounted.

The needle-point 28 between beam 17 and counterweight-receiver 32 is also believed to be an important detail of construction for maintaining the lateral gravity of beam 17, inasmuch as a knife-edged pivot of the usual construction when employed in this particular place would admit of destroying the lateral gravity of beam 17 when one or more counterweights 65 would be placed slightly off the center of said receiver 32.

From the foregoing it is obvious that the broad scope and primary character of this invention is believed to entitle it to consideration as a pioneer invention employing a weight-receiving member, a weight-counterbalancing member, a value-indicator, and a variably-graduated price-beam intermediate said weight-receiving and counterbalancing members and adapted to vary the influence of said counterbalancing member upon said weight-receiving member proportionate to the price indicated upon said price-beam, and this invention is believed to consist in and anticipate the employment of said elements, however widely they may be varied in construction or arrangement.

In the more specific embodiment of the invention a variable incline is placed intermediate the value-indicating and counterbalancing member and the weight-receiving member, the angle of inclination of said incline being varied proportionate to the price-computing unit for the purpose of causing said value-indicator to indicate values proportionate to the price or computing unit indicated by the angle of inclination of the said incline, and in the precise embodiment of the invention the angle of inclination of said incline for each price or computing unit is variable, said variations being greater for small than for high values of the price or computing unit. It is also obvious that in constructions where the value-indicator is mounted upon said weight-counterbalancing member said incline is also intermediate said weight-receiving member and the said value-indicator and weight-counterbalancing member, and said incline controls the action of both said value-indicator and said counterbalancing member. It is furthermore obvious that weights 65 of various sizes may alone constitute the weight-counterbalancing member, and the value characters indicated directly or indirectly by said weights may alone constitute the value-indicator.

So far as I am aware, the late HENRY C. STILWELL was the first in the art to employ a price-varying incline directly or indirectly controlling a value-indicator to indicate values at a rate proportionate to the angle of inclination of said incline, and so being a pioneer in this particular art the claims should be given a correspondingly broad and liberal interpretation.

Having now so fully described this invention, that others skilled in the art can make and use the same when this exclusive grant shall cease to operate, what I claim, and desire to secure by Letters Patent, is—

1. In a price-scale the combination of the following instrumentalities, to wit; a goods-support, a price-beam having pivotal supports, and connected with the goods-support, a value-beam in balance on its pivotal supports and in operative engagement with the price-beam at a point having a fixed relation to the value-beam, the distance between the point of operative engagement of the beams and fulcrum of the price-beam being variable to vary the power of the price-beam as a lever between the value-beam and goods-support whereby the scale may be set to indicate value at different rates and a value-weight carried by the value-beam; substantially as described.

2. In a price and value indicating scale, the combination of the following instrumentalities, to wit; a support for the goods to be weighed, a value-beam, a price-beam in loose operative engagement with the value-beam at a point having a fixed relation to the axis of the value-beam and interposed between the value-beam and goods-support, said goods-support and price-beam counterbalancing each other, and with the value-beam being normally in balance, when the value-weight is not in position to indicate value, a value-weight coöperating with the value-beam to balance the goods and indicate the value thereof, the distance between the point of operative engagement of the beams and fulcrum of the price-beam being variable whereby the leverage exerted by the price-beam in transmitting the balancing strain between the value-weight and goods-support may be varied and the scale set to indicate value at different prices; substantially as described.

3. In a price and value indicating scale, the combination of the following instrumentalities, to wit; a goods-support a pivoted price-beam connected therewith, a value-beam having a pivotal axis different from that of the price-beam and adapted to coöperate with the price-beam at a fixed distance from the pivotal axis of the value-beam but at different points with relation to the pivots of the price-beam, whereby the leverage of the price-beam may be varied and a value-weight carried by the value-beam; substantially as described.

4. In a price and value indicating scale, the combination of the following instrumentalities, to wit; a goods-support, a pivoted price-beam connected and in balance therewith, a value-beam independently in balance and in operative engagement with the price-beam at a fixed distance from the fulcrum of the value-beam, a value-weight carried by the value-beam, the distance between the point of operative engagement of the beams and fulcrum of the price-beam being variable to vary the power of the price-beam as a lever between the value-beam and goods-support, whereby the scale may be set to indicate value at different rates; substantially as described.

5. In a price and value indicating scale, the combination of the following instrumentalities, to wit; a goods-support, a value-beam, a sliding value-weight on said beam, a beam having a fixed fulcrum and located intermediate the goods-support and value-beam, said beam constituting a price-beam, the point of application of the draft of the value-beam to said price-beam being variable with respect to the pivots of the latter to vary the effective leverage of the price-beam in accordance with the price; substantially as described.

6. In a price and value indicating scale the combination of the following instrumentalities, to wit; a beam, a member angularly adjustable with relation thereto and whose angular position determines the price, a weight member adjustable longitudinally on the angularly-adjustable member and whose position thereon determines the value, a goods-support and connections between the same and beam; substantially as described.

7. A weight-receiving member, a tilting frame connected thereto and in balance therewith, an independently-balanced beam pivotally mounted upon said frame and movable laterally with relation thereto, a value-indicating poise upon said beam, and price-indications with which the beam registers.

8. A weight-receiving member, a fulcrumed frame connected thereto and in balance therewith, a beam mounted upon said frame with its extremities movable toward and from the fulcrum of said frame, price-indications with which the beam registers in its movements upon said frame, and a value-indicating poise on said beam.

9. A weight-receiving member, a fulcrumed frame connected thereto, an independently-movable beam having a value-poise and connected to said frame, and a series of price-indications arranged variable distances apart to indicate regular increments in price, and with which the beam registers in its movements upon said frame and a series of value-indications on the beam with which the poise registers.

10. A weight-receiving member, a fulcrumed frame connected thereto, a beam movably connected to said frame, a value-poise upon said beam and adapted to indicate a series of value-graduations, and a series of price-indications arranged variable distances apart upon said frame to indicate regular advances in price, said price-indications being adapted to be indicated by the movement of said beam upon said frame.

11. A weight-receiving member, a fulcrumed frame connected thereto, a beam movably connected to said frame, a value-poise upon said beam and adapted to indicate a series of value-graduations, a series of price-graduations upon said frame and arranged variable distances apart to indicate regular advances in price as said graduations approach the fulcrum of said frame, and an indicator carried by said beam and adapted to indicate said price-graduations 12. In a scale, a weight-receiving member, a curved beam 25 connected thereto, a series of price-graduations upon said beam 25, and a counterbalance member counterbalanced within itself and movable upon said beam 25 and an adjustable load-counterbalancing member.

13. In a scale, a weight-receiving member, a curved beam 25 connected thereto, a series of price-graduations arranged variable distances apart, upon said beam 25 to indicate regular advances in price from the outer to the inner end of said beam 25, and a weight-counterbalancing member counterbalanced within itself and movable upon said beam 25, and an adjustable load-counterbalancing member.

14. In a scale, a weight-receiving member, a curved beam 25 connected thereto, a series of price-graduations arranged variable distances apart on said beam 25 to indicate regular advances in price from the outer to the inner end of said beam 25, a beam 17 pivoted upon said beam 25, a poise upon said beam 17 and adapted to indicate a series of graduations, and an indicator upon said beam 17 and adapted to indicate said price-graduations upon said beam 25.

15. In a scale, a weight-receiving member, a beam 25 connected thereto, a series of price-graduations arranged variable distances apart on said beam 25 to indicate regular advances in price from the outer to the inner end of said beam 25, a beam 17 pivoted upon said beam 25, a value-indicating poise upon said beam 17, an indicator upon said beam 17 and adapted to indicate said price-graduations upon said beam 25, and a laterally and longitudinally adjustable weight upon said beam 17.

16. In a scale, a weight-receiving member, a beam 25 connected thereto, a series of price-graduations arranged variable distances apart on said beam 25 to indicate regular advances in price from the outer to the inner end of said beam 25, a beam 17 pivoted upon said beam 25, a value-indicating poise upon said beam 17, an indicator upon said beam 17 adapted to indicate said price-graduations upon said beam 25, a needle-point 28 upon said beam 17, a counterweight-receiver 32 supported by said needle-point 28, one or more counterweights 65 adapted to be placed upon said receiver 32, and a laterally and longitudinally adjustable weight 19 upon said beam 17.

17. A weight-receiving member, a value-beam and poise thereon, a variably-graduated price-beam intermediate said value-beam, and member, and a tare-beam connected to said weight-receiving member.

18. A weight-receiving member, a value-beam and poise thereon, a price-graduated beam intermediate said member and value-beam, said price-graduations on said price-beam being arranged variable distances apart to indicate regular advances in price, means for changing and indicating the price, and a tare-beam connected with said weight-receiving member.

19. A weight-receiving member, a value-beam and value-indicating poise thereon, a price-graduated beam intermediate said member and value-beam, said price-graduations on said price-beam being arranged variable distances apart to indicate regular advances in price, means for changing and indicating the price, a tare-beam connected with said weight-receiving member, a poise upon said tare-beam and adapted to indicate weight, a counterweight-receiver 32 connected to said value-beam, and a counterweight 65 adapted to be placed upon said receiver 32.

20. In a price-computing scale, the combination with a goods or weight support and a pivotal member connected therewith, of a separate value-beam controlling the balance of the pivotal member, the distance between the point of connection of the value-beam with the free end of the pivotal member and the point of intersection of the horizontal axis of the latter and the longitudinal center of the beam being relatively fixed at all times, and means for varying the power exerted by the beam on the pivotal member whereby value may be computed at different rates per unit; substantially as described.

21. In a computing-scale, the combination with a value-beam having computations of value thereon, a poise on said beam and a goods receiver or support, of an intermediate pivoted vertically-swinging member, constituting a lever upon which the beam is mounted and forming the connection between the beam and goods-support with means for varying the effective leverage of the value-beam, whereby the scale may be set to compute values at different rates per unit; substantially as described.

22. A scale consisting of a beam having a weight-receiving arm and a weight-receiving swinging beam balanced thereon.

23. A scale consisting of a beam having a weight-receiving arm and a weight-receiving swinging beam balanced on the beam, so as to swing in a plane parallel to the axis thereof.

24. In a computing-scale, the combination with the main beam, of a swinging beam, mounted thereon, the said main beam and swinging beam being provided, one with a series of value-graduations and the other with a series of price-graduations.

CHARLES F. SNYDER,
*Administrator of the estate of Henry C. Stilwell, deceased.*

Witnesses:
H. M. WALSH,
ISAAC G. KENNEDY.